United States Patent [19]
Preiser et al.

[11] 3,709,039
[45] Jan. 9, 1973

[54] COMFORT HUMIDITY INDICATOR

[75] Inventors: Ralph H. Preiser; Clarence J. Goodwin, both of Peru; Robert D. Cofoid, Tonica, Ill.

[73] Assignee: General Time Corporation, Phoenix, Ariz.

[22] Filed: Aug. 31, 1970

[21] Appl. No.: 68,072

[52] U.S. Cl. .................................73/336, 73/344
[51] Int. Cl. .........................G01n 19/10, G01w 1/04
[58] Field of Search .....73/336, 368.7, 344; 235/109, 235/112, 113

[56] References Cited

UNITED STATES PATENTS

| | | | |
|---|---|---|---|
| 2,106,083 | 1/1938 | Chappell | 73/336 |
| 1,460,909 | 7/1923 | Joannes | 73/368.7 |
| 1,998,340 | 4/1935 | Streb | 73/337 |
| 2,874,571 | 2/1959 | Hevener | 73/336 |

*Primary Examiner*—S. Clement Swisher
*Assistant Examiner*—Denis E. Corr
*Attorney*—Pennie, Edmonds, Morton, Taylor and Adams

[57] ABSTRACT

A weather instrument including a hygrometer and an outdoor thermometer, an indoor thermometer, and means operatively associated therewith for providing an indication of the relative humidity required to maintain a predetermined temperature-humidity relationship. In one embodiment, a cam-filament arrangement responds to a manual positioning, in accordance with information derived from integral measuring devices, to automatically provide an indication of the relative humidity required to maintain a predetermined temperature humidity relationship. The deviation between ambient and optimum humidity is ascertained by comparison of the coaxially mounted instruments indicating these two conditions.

7 Claims, 2 Drawing Figures

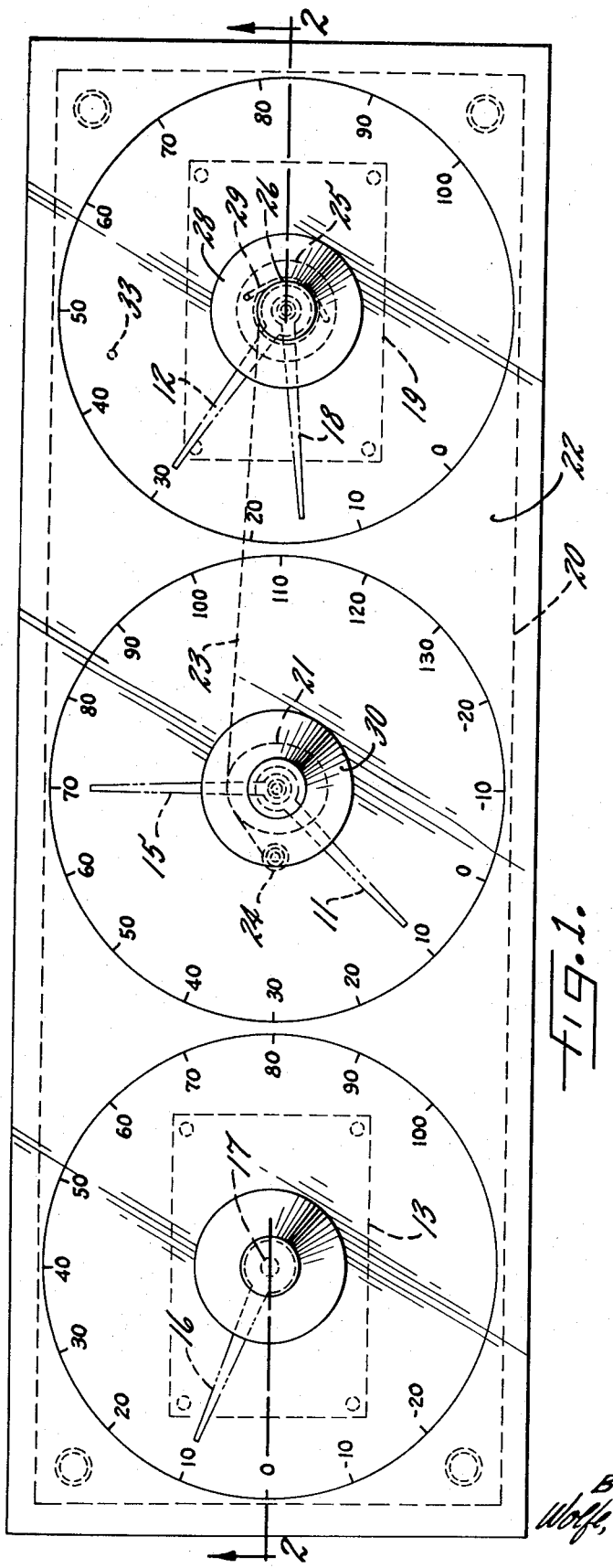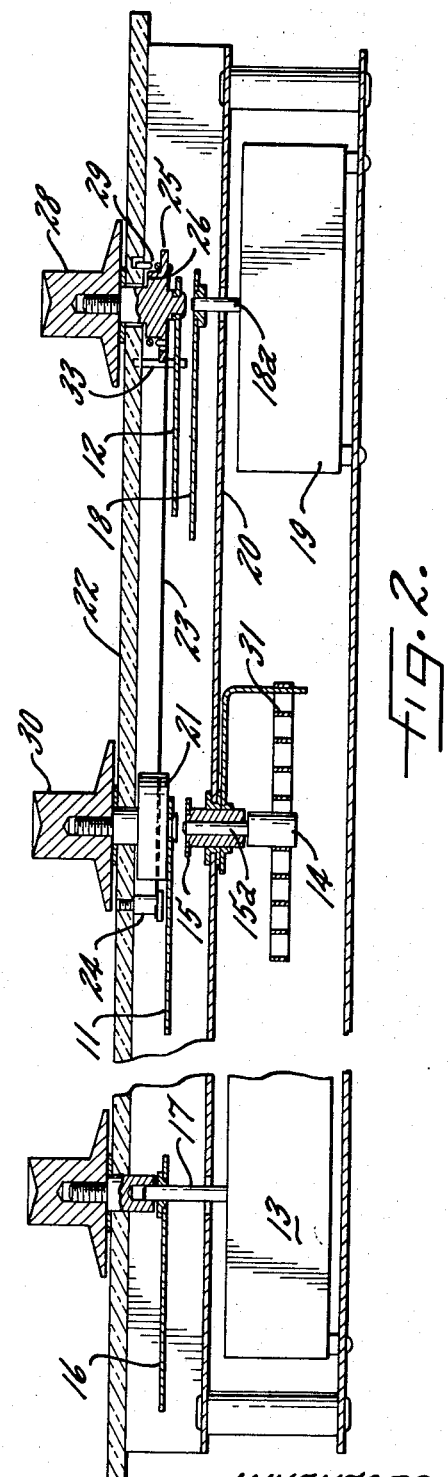

COMFORT HUMIDITY INDICATOR

The present invention relates generally to weather instruments and, more particularly, to instruments which indicate the relative humidity required to correspond to the comfort relative humidity for a given outdoor temperature.

The comfort relative humidity referred to hereafter as CRH, is a numerical designation which indicates that indoor relative humidity which for a given outdoor temperature has been determined to be most beneficial to health, homes, and home furnishings. That number is determined by the following relationships:

1. For outdoor temperatures which vary between −20°F and +40°F the comfort relative humidity varies linearly from 15% relative humidity at a temperature of −20°F to 45% relative humidity at a temperature of +40°F.
2. For outdoor temperatures above +40°F the comfort relative humidity remains a constant 45%.

It is a primary object of the present invention to provide an improved instrument which senses the outdoor temperature and, by manual positioning of an indicator to correspond to the sensed outdoor temperature, produces an output indicating the humidity condition corresponding to the desired CRH.

An important object of the invention is to provide, by use of co-axially mounted relative humidity indicating means, an instantaneous indication of a discrepancy between optimum and ambient relative humidities.

Another object of the invention is to provide such an instrument which has a high degree of accuracy over relatively wide ranges of temperature and relative humidities.

Still another object of the invention is to provide such an improved instrument which provides a continuous indication of ambient conditions and outside temperature.

Yet another object of the invention is to provide an instrument of the type described, which can be manufactured simply and rapidly at a low cost, and yet is accurate and reliable over long operating periods. In this connection, a related object is to provide such an instrument which can be efficiently manufactured at high production rates.

Other objects and advantages of the invention will become apparent upon reading the following detailed description upon reference to the drawings, in which:

FIG. 1 is a front elevation view of the indicating and calculating portion of a weather instrument embodying the present invention.

FIG. 2 is a section taken along 2—2 in FIG. 1.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention.

Turning now to the drawings and referring first to FIG. 1, there is illustrated a weather instrument having three different meters for providing separate indications of outdoor temperature, indoor temperature and ambient relative humidity.

The ambient relative humidity indicator 18 associated with a relative humidity scale is mounted on the output shaft 18a of a conventional hygrometer unit 19, which is preferably of the type utilizing a nylon 6 film as its humidity sensing element as described in a copending R. H. Preiser et al. application Ser. No. 628,166, filed Apr. 3, 1967, entitled "Hygrometer" and assigned to the assignee of the present invention; however, the invention is not limited to this particular hygrometer movement. The relative humidity scale is located on the front of the display panel 20 of the instrument to provide a continuous direct reading of the ambient relative humidity.

The indoor temperature indicator 15, associated with a temperature scale, is mounted on the output shaft 15a of a conventional thermometer unit 14, which is preferably of the type utilizing a bi-metal element 31 as the temperature sensing element. The temperature scale is located on the front of the display panel 20 of the instrument to provide a continuous direct reading of the indoor temperature.

The outdoor thermometer portion of the illustrative instrument includes an indicator 16, associated with a temperature scale, and the indicator 16 is secured to the output shaft 17 of a conventional outdoor temperature sensing unit 13. The outdoor temperature scale is located on the front of the display panel 20 providing a continuous direct reading of the outdoor temperature. The temperature sensing unit 13 is preferably of the electronic type utilizing as the sensing element, a thermistor, but the invention is not intended to be limited to this particular type of temperature sensing means.

In accordance with one important aspect of the present invention, the relative humidity required to maintain a predetermined condition in the ambient indoor atmosphere is automatically determined by a calculating means responsive to a manually positioned input. To this end there is provided a set hand 11, which is associated with the indoor temperature scale and mounted co-axially with the indoor temperature indicator 15; the manual positioning of set hand 11 produces an instantaneous output corresponding to the relative humidity required to maintain a predetermined condition in the indoor atmosphere. Thus, in the illustrative embodiment of FIGS. 1 and 2, the temperature set-hand 11 is fixed to a cam 21 which is journalled in the lens 22 of the instrument. Cam 21 protrudes through the lens 22 and to this protrusion is fixed knob 30 by which the cam and the set-hand 11 are manually rotated.

The peripheral surface of the cam 21 acts on a tensioned filament 23, one end of which is attached to a stud 24 which is thread mounted to project inwardly from the lens 22. The other end of the filament 23 is secured to the CRH indicator 12 by means of a drum 25 which in turn is journalled in the lens 22. In this arrangement the drum and lens hole perform the function of a bearing and bearing assembly, the drum 25 is secured by means of a drum shoulder 26 and a threaded knob 28. The filament is kept under constant tension by means of a spring 29 attached to the lens 22 which acts upon the drum 25 to provide a clockwise bias to the drum. As the set-hand 11 is manually rotated in respect to the indoor temperature scale, by means of knob 30 to correspond to the outdoor temperature as determined by observation of the indicator 16, the cam 21 which is attached to the set-hand 11 is also rotated. This rotation of cam 21 displaces the filament 23 which is kept in contact with cam 21 by the constant tension provided by spring 29. This displacement of the filament causes a corresponding increase or decrease in the filament tension. As the tension in the filament is decreased the drum, and indicator 12, which is fixed to the drum, rotate in a clockwise direction. As tension is increased the spring 29 is deflected causing the drum 25 and indicator 12 to rotate in a counterclockwise direction. When the indicator 12 is rotated relative to the relative humidity indicator scale it provides an instantaneous indication of the relative humidity required to provide the optimum comfort condition.

A means for calibration of the tension in filament 23 is provided by the adjustable stud 24. Rotation of the stud 24 causes a displacement of the filament 23 independent of cam 21. This displacement of the filament 23 through operative means as described above to the CRH scale.

In keeping with the present invention, the cam 21 is designed so that the angular displacement thereof and the longitudinal displacement of the filament 23 in response thereto varies in accordance with the relative humidity required to maintain an optimum comfort condition for a given outdoor temperature. More particularly, the cam 21 is designed so that the angular displacement thereof causes a corresponding displacement of the comfort humidity indicator in accordance with the following chart, wherein the critical temperature is the outdoor temperature:

| Outdoor Temp. °F | Displacement in Angular Degrees | %CRH | Displacement in Angular Degrees |
| --- | --- | --- | --- |
| −20 | 0 | 15 | 0 |
| −10 | 22.5 | 20 | 13.5 |
| 0 | 22.5 | 25 | 13.5 |
| +10 | 22.5 | 30 | 13.5 |
| +20 | 22.5 | 35 | 13.5 |
| +30 | 22.5 | 40 | 13.5 |
| +40 | 22.5 | 45 | 13.5 |

For outdoor temperatures above +40°F the percent CRH remains a constant 45. To ensure that a CRH in excess of 45 is never indicated, there is provided a CRH indicator stop 33 which is mounted in the lens 22 and acts to prevent the CRH indicator 12 from ever rotating past the position which provides a CRH indication of 45.

The set-hand temperature dial calibration and the relative humidity dial calibration are designed to produce results in accordance with the functions outlined in the preceding table, however, it must be noted that the design of the invention is not limited to particular angular relationships or displacements. Moreover the calculating mechanism is not limited to any particular function or relationship, but may be designed to employ any temperature humidity relationship.

An illustration of how the invention operates may be seen by referring to FIG. 1. The outdoor temperature is indicated as being +10°F (16). The set-hand 11 is positioned to correspond with that indicated outdoor temperature of +10°F. The required comfort relative humidity indicator has been rotated in accordance with the cam-filament calculating mechanism to indicate an optimum humidity of 30 percent which corresponds to the relative humidity desired as indicated in the chart for an outdoor temperature of +10°F. Another aspect of the invention is that the descrepancy between desired and ambient relative humidities may quickly be ascertained by observing the angular displacement between the co-axially mounted indicators 12 and 18 in this instance a deficiency of 15 percent in the relative humidity exists.

From this description it may be ascertained the invention embodies very few moving parts, consequently the invention may be reliably reproduced at a high production rate with attendant low costs.

We claim as our invention:

1. A weather instrument comprising the combination of an outdoor sensing and indicating means for producing a continuous indication of the outdoor temperature, ambient relative humidity sensing and indicating means for producing a continuous indication of the relative humidity of the ambient indoor atmosphere, and nonlinear means responsive to a manual positioning in accordance with said outdoor temperature for transposing said outdoor temperature to a preselected indoor comfort relative humidity on said means for indicating said relative humidity, said ambient relative humidity indicating means being operatively associated with said output indicating said comfort relative humidity for producing an instantaneous indication of the differential between said comfort relative humidity and the ambient relative humidity.

2. A weather instrument as set forth in claim 1 which includes a manually operable knob rotatably mounted on the front of the instrument, an indicating means operatively connected to said knob and associated with an indoor temperature scale to permit manual setting of said indicating means to a temperature value corresponding to the indicated outdoor temperature, and said transposition means including cam means responsive to rotation of said manually operable knob for producing said output indicating a preselected indoor comfort relative humidity.

3. A weather instrument as set forth in claim 2 which includes a comfort relative humidity indicating means operatively connected to said cam means, and an ambient relative humidity sensing and indicating means which produces a continuous indication of the ambient indoor atmosphere, said ambient and comfort indicating means being operatively associated to produce an indication of the differential between said comfort relative humidity and the ambient relative humidity.

4. A weather instrument as set forth in claim 2 wherein said indication of comfort relative humidity produced by said calculating means and an ambient relative humidity sensing and indicating means producing a continuous indication of the ambient indoor atmosphere are operatively associated to provide an instantaneous indication of the differential between said comfort relative humidity and said ambient indoor relative humidity.

5. A weather instrument comprising the combination of first sensing means responsive to changes in ambient outdoor temperature for producing a first continuous output corresponding to the ambient outdoor temperature, calculating means responsive to manual positioning in accordance with the indicated ambient outdoor temperature for producing an instantaneous indication corresponding to a preselected comfort relative humidity, wherein the comfort relative humidity is indicated as a decimal fraction which varies between 15 percent and 45 percent in a direct linear relationship to ambient outdoor temperatures in the temperature range of −20°F. to +40°F, and remains constant at 45% for outdoor temperatures greater than +40°F.

6. A weather instrument as set forth in claim 5 wherein said indication of comfort relative humidity produced by said calculating means and ambient relative humidity sensing and indicating means producing a continuous indication of the ambient indoor atmosphere are operatively associated to provide an instantaneous indication of the differential between said required comfort relative humidity and said ambient indoor relative humidity.

7. A weather instrument comprising the combination of first sensing means responsive to changes in outdoor temperatures for producing a first continuous output corresponding to the ambient outdoor temperature, calculating means responsive to manual positioning in accordance with the indicated ambient outdoor temperatures for producing an instantaneous indication corresponding to a preselected indoor comfort relative humidity, wherein the required comfort relative humidity is indicated as a decimal fraction which varies in a relationship to the ambient outdoor temperature in accordance with the following table:

| Outdoor Temperature °F | Comfort Relative Humidity % |
|---|---|
| −20 | 15 |
| −10 | 20 |
| 0 | 25 |
| +10 | 30 |
| +20 | 35 |
| +30 | 40 |
| +40 | 45 |
| all temperatures above +40° | 45 |

* * * * *